United States Patent
Setiabudi et al.

(10) Patent No.: US 6,629,358 B2
(45) Date of Patent: *Oct. 7, 2003

(54) PROCESS FOR THE PRODUCTION OF LAMINATED CORES

(75) Inventors: Frans Setiabudi, Eschbach (DE); Michel Gehrig, Liestal (CH); Ulrich Massen, Rheinfelden (DE); Roland Moser, Riehen (CH); Thomas Moser, Magden (CH); Luitpold Miller, Ottobrunn (DE); Wolfgang Hahn, Kassel (DE)

(73) Assignees: Thyssen Transrapid System GmbH, Kassel (DE); Vantico Inc., Brewster, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/117,772
(22) PCT Filed: Jan. 31, 1997
(86) PCT No.: PCT/DE97/00200
§ 371 (c)(1),
(2), (4) Date: Mar. 8, 1999
(87) PCT Pub. No.: WO97/30504
PCT Pub. Date: Aug. 21, 1997

(65) Prior Publication Data
US 2001/0001895 A1 May 31, 2001

(30) Foreign Application Priority Data
Feb. 12, 1996 (CH) ................................................ 359/96

(51) Int. Cl.$^7$ .............................. H01F 7/06; H01F 3/02
(52) U.S. Cl. .................... 29/609; 29/596; 29/DIG. 1; 264/261; 264/272.19; 264/272.2; 156/305; 156/330

(58) Field of Search .......................... 29/609, 596, 598, 29/DIG. 1, DIG. 29; 310/42, 43; 264/272.19, 272.2, 261; 156/305, 330

(56) References Cited

U.S. PATENT DOCUMENTS 3,304,358 A * 2/1967 De Jean et al. ................ 29/609

(List continued on next page.)

FOREIGN PATENT DOCUMENTS

DE          31 10 339 C2      9/1982

(List continued on next page.)

OTHER PUBLICATIONS

Kunststoff–Lexicon, HRG.– DR.–ING. K. Stoeckhart and Prof. DR.–ING. W. Woebcken, Carl Hansen Verlag, BRD 8th Edition, 1992.

(List continued on next page.)

*Primary Examiner*—A. Dexter Tugbang
(74) *Attorney, Agent, or Firm*—Michael J. Striker

(57) ABSTRACT

The method of manufacturing a sheet stack for electromagnetic assemblies, consisting of ferromagnetic material, includes forming the sheet stack from raw magnetic steel sheets in a shaping tool without the use of spacers, if necessary with the help of positioning aids, and simultaneously introducing a hardenable mixture into the shaping tool in order to totally surround the sheet stack and to form an anti-corrosion layer and hardening or hardening out this casting compound according to the pressure-gelating method to connect the sheets together and to form the finished sheet stack in one single working step. An electromagnetic assembly including at least one of the sheet stacks and an additional component is made in the same working step by a method including making the finished sheet stack in accordance with the foregoing pressure-gelating method, connecting the finished sheet stack to the additional component to form the assembly and surrounding the assembly with the mixture in order to form the anti-corrosion layer.

12 Claims, 8 Drawing Sheets

U.S. PATENT DOCUMENTS

| | | | | |
|---|---|---|---|---|
| 3,533,867 A | * | 10/1970 | Van Derzee | 29/609 |
| 3,631,590 A | * | 1/1972 | Wichmann et al. | 264/272.2 |
| 3,813,763 A | * | 6/1974 | Church | 29/596 |
| 5,088,186 A | * | 2/1992 | Boesel | 29/605 |
| 5,176,946 A | * | 1/1993 | Wieloch | 428/138 |
| 5,317,300 A | * | 5/1994 | Boesel | 336/96 |
| 5,926,946 A | * | 7/1999 | Minato et al. | 29/606 |

FOREIGN PATENT DOCUMENTS

| | | | |
|---|---|---|---|
| DE | 34 10 119 A1 | 10/1985 | |
| DE | 33 03 961 C2 | 12/1989 | |
| DE | 40 21 591 C2 | 9/1992 | |
| DE | 43 38 913 A1 | 5/1995 | |
| JP | 61-115979 * | 6/1986 | 156/330 |
| WO | WO 96/16100 | 5/1996 | |
| WO | WO 96/20235 | 7/1996 | |

OTHER PUBLICATIONS

Becker/Braun Kunststoff–Handbuch, vol. 10, Duroplaste, Carl Hansen Verlag 1988.

* cited by examiner

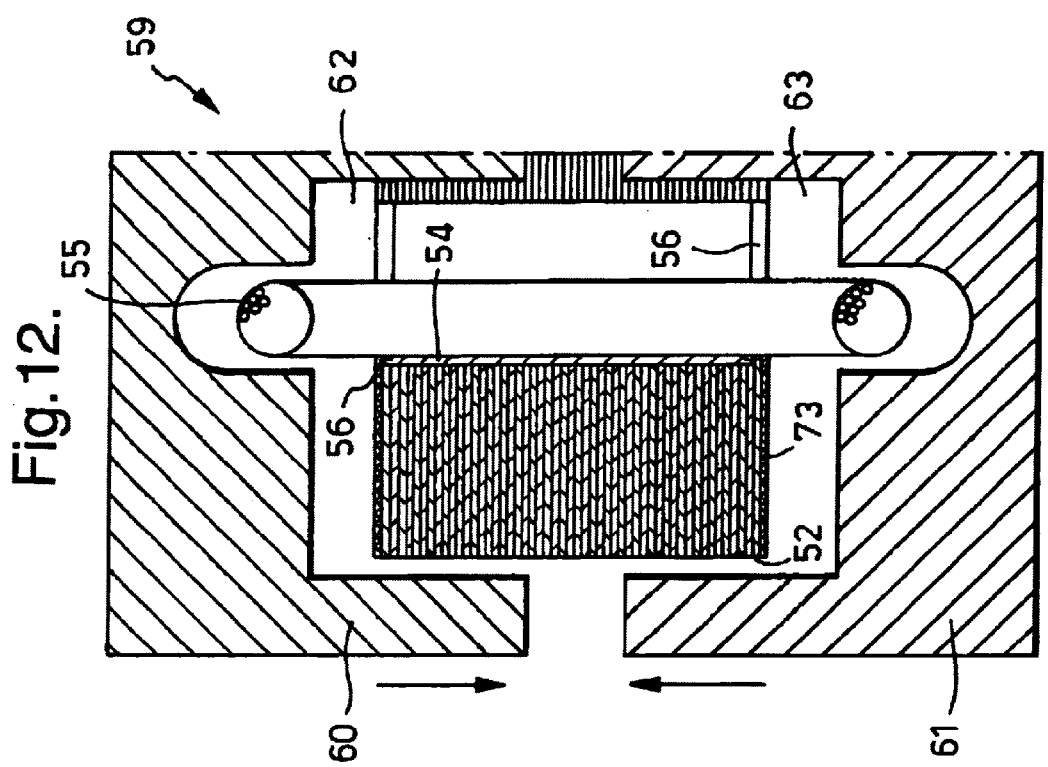
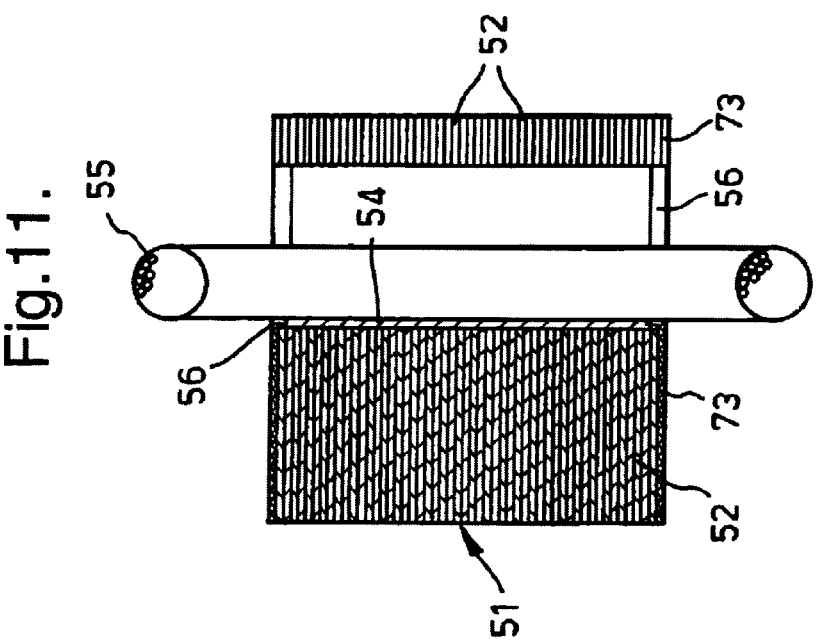

PROCESS FOR THE PRODUCTION OF LAMINATED CORES

BACKGROUND OF THE INVENTION

Field of the Invention

The invention relates to a method of manufacturing sheet stacks for electromagnetic assemblies, consisting of ferromagnetic material, and for the manufacture of electromagnetic assemblies provided with such sheet stacks and one additional component. The invention also relates to sheet stacks and components manufactured according to these methods.

Electromagnetic assemblies which operate with alternating fields, frequently have iron cores of ferromagnetic material, which serve the purpose of guiding magnetic fields at every point where no air gaps are provided or desired. In order to avoid eddy current and eddy current losses, these iron cores are predominantly assembled from a plurality of sheet metal blanks, which are obtained by stamping from sheet metal panels or strips, which consist for example of steel or iron plates e.g. 0.35 to 1.00 mm thick, and which are insulated from one another by a lacquer coating, an oxide layer or other means. The insulation can be applied to the bands, strips or panels either already in the rolling mill to the sheet metal band or strip, or subsequently in a special coating plant, and nowadays usually consists of an extremely thin silica phosphate layer, which is applied as the sheets are rolled out.

In addition it is frequently desired to connect the individual stamped blanks together to form a solid sheet stack. This is achieved e.g. by the use of form-fitting or positive-locking mechanical means or simply by surrounding the finished sheet stacks or cores by a winding, in which case it is however also necessary electrically to insulate the windings from the core.

In order to avoid such connection methods, which are in fact comparatively cost-effective, but cannot always be used, it is already known (DE 31 10 339 C2) firstly to provide strips manufactured from silicated magnetic steel sheet preferably on both sides with additional adhesive layers, which consist for example of a pre-hardened duroplastic adhesive, and if necessary are applied in the rolling mill in a complex, expensive working step. The sheet stacks are then produced by stamping out sheet metal blanks or lamellae from such sheet metal strips drawn off from coils (drums), and these are then combined into stacks and thereafter securely fastened together by heating with simultaneous pressure, in order to form a mechanically secure sheet stack. Then the finished sheet stacks are additionally provided with a coating of an epoxy resin or the like, in order to provide the cut edges of the sheets revealed during cutting subsequently with an anti-corrosion layer. This method is therefore in fact suitable for manufacturing compact, high-quality sheet stacks, but due to the high technical outlay and the necessarily high manufacturing costs for coating the sheets with adhesive, is only infrequently used. A further disadvantage is that the off-cuts occurring during stamping of the sheet metal blanks are provided with an adhesive layer, which prevents properly categorized recycling of the sheet metal off-cuts, and therefore should be avoided for reasons of environmental protection.

Sheet stacks of the type described are in addition frequently connected together with other components in order to form finished assemblies. In this respect it is for example known (DE 40 21 591 C2) to surround the individual parts of the stator of an electric motor, particularly a sheet stack and the associated windings, with a casting resin in a shaping tool, so that on the one hand the windings are electrically insulated and on the other hand a cohesive composite member is obtained. Correspondingly, it is known in manufacturing the rotors of electric motors (DE 43 38 913 A1) firstly to assemble the associated shafts, sheet stacks, windings and commutators loosely together, and then to provide them with a plastic covering in a shaping tool by injection molding, injection pressure or the like. This does in fact give rise to the advantage that the sheet stack is subsequently provided with an insulation or an anti-corrosion layer on the cut edges revealed during stamping of the plates. In all these methods however a condition is the presence of finished sheet stacks produced in the way explained above.

SUMMARY OF THE INVENTION

It is an object of the present invention to provide a method for manufacturing sheet stacks and electromagnetic assemblies provided with sheet stacks, which enables the use of simple, cost-effective plates, whose off-cuts can be disposed of in an environmentally acceptable manner, and which further requires fewer individual steps than previously and therefore in particular leads to simplifications in manufacture of the assemblies. Moreover, a high degree of mechanical strength and a high degree of resistance to external or internal weathering influences is to be achieved.

According to the invention the method of manufacturing a sheet stack for electromagnetic assemblies, consisting of ferromagnetic material, comprises forming the sheet stack from raw magnetic steel sheets in a shaping tool without the use of spacers, if necessary with the help of positioning aids, and simultaneously introducing a hardenable mixture into the shaping tool in order to totally surround the sheet stack and to form an anti-corrosion layer and hardening or hardening out this casting compound according to the pressure-gelating method to connect the sheets together and to form the finished sheet stack in one single wording step.

According to the invention the method of manufacturing the electromagnetic assembly including at least one sheet stack and one additional component comprises making the finished sheet stack in accordance with the foregoing pressure-gelating method, connecting the finished sheet stack to the additional component to form the assembly and surrounding the assembly with the mixture in order to form the anti-corrosion layer.

Further advantageous features of the invention will become apparent from the sub-claims.

In a preferred embodiment of both methods according to the invention a pressure of from 2 to 10 mbar is maintained in the shaping tool. The assembly as a whole is preferably only provided with its final electrical, mechanical and/or geometric properties by means of the hardenable mixture and the hardenable mixture is advantageously a thermally hardenable mixture.

The invention may with advantage be used at every point where sheet stacks made of ferromagnetic material are required. The term "electromagnetic assemblies" therefore in particular comprises electrical motors on a basis of three-phase, synchronous and asynchronous current and parts thereof such for example as stators and runners as well as choke coils with iron cores, transformers and magnets, particularly load-raising or lifting magnets and parts thereof.

BRIEF DESCRIPTION OF THE DRAWING

The invention will be explained in more detail in the following with reference to two embodiments given by way of example, which are shown in the accompanying drawing on slightly varying scales, in which:

FIG. 11 is a cross-section along the line XI—XI of FIG. 10;

FIG. 12 is a cross-section similar to FIG. 11 through the assembly, but after insertion into a tool, which serves to impregnate the sheet stack and the winding, to connect the sheet stack with the windings of the stator, and to surround the entire stator with a hardenable mixture;

The invention will be explained in more detail in the following with reference to the examples of a magnet pole, which is suitable for example for a magnetic levitation train (DE 33 03 961 C2 and DE 34 10 119 A1), and of a stator for an electric motor, whose construction, function and geometry are well known to the person skilled in the art and therefore need no further detailed explanation.

In a known way, a magnet pole includes an iron core consisting of a sheet stack, and a winding applied thereto. According to FIGS. 1 to 8 the iron core consists of a plurality of individual sheets or lamellae 1, arranged in parallel and aligned flush on one another, which have been obtained for example by stamping out from a ferromagnetic magnetic sheet strip, which has been unwound from a drum (coil), and passed to a stamping tool. According to the invention, a raw magnetic steel sheet strip is involved. In this respect the term "raw" is understood to mean that the magnetic steel sheet strip, contrary for example to DE 31 10 339 C2, has no adhesive layer applied in a separate working procedure. On the contrary, the sheet strip, as is conventional with magnetic steel sheets, can be provided with an electrically insulating layer by means of a lacquer coating, an oxide layer or other means which may be applied in a cost-effective manner on both sides. This layer can already be applied in the rolling mill to the sheet strip, and in the case of magnetic steel sheets conventional today usually consists of an extremely thin silica phosphate layer, which is produced as the magnetic steel sheets are rolled out. For the purposes of the invention this layer is comparatively irrelevant, as under certain circumstances it can also be totally omitted.

Figure 1:
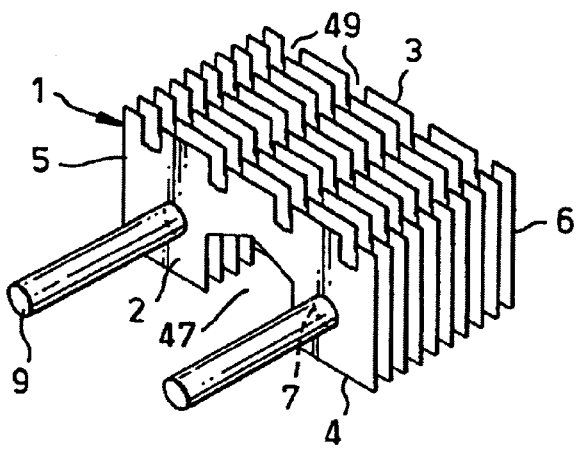
FIG. 1 is a perspective, exploded view of some plates of a sheet stack for a magnet core according to the invention.

The individual sheets 1, of which only a few are shown in FIG. 1, in the embodiment have a thickness of for example 0.35 to 1.00 mm, and have identical dimensions, and each have a forward or rear wide side 2, and in the respective circumferential directions, a narrow upper side 3, a lower side 4 and two side edges 5 and 6. In addition, they are each provided during the stamping procedure at identical points with at least one hole 7 and in order to form the iron core after the stamping procedure into packets 8 (FIG. 2), are stacked, being laid on one another with their forward or rear wide sides 2 flush and parallel with one another. The number of sheets 1 per packet 8 depends on the size and thickness of the magnetic pole to be produced. The mutual alignment of the sheets 1 is carried out appropriately with the aid of slide blocks or rods 9, upon which the sheets 1 are threaded with their holes 7. In the stacked sheet packet 8, for example, the upper sides 3 of the individual sheets 1 form a magnet pole surface 10, while the undersides 4 form an assembly surface 11.

Figure 2:
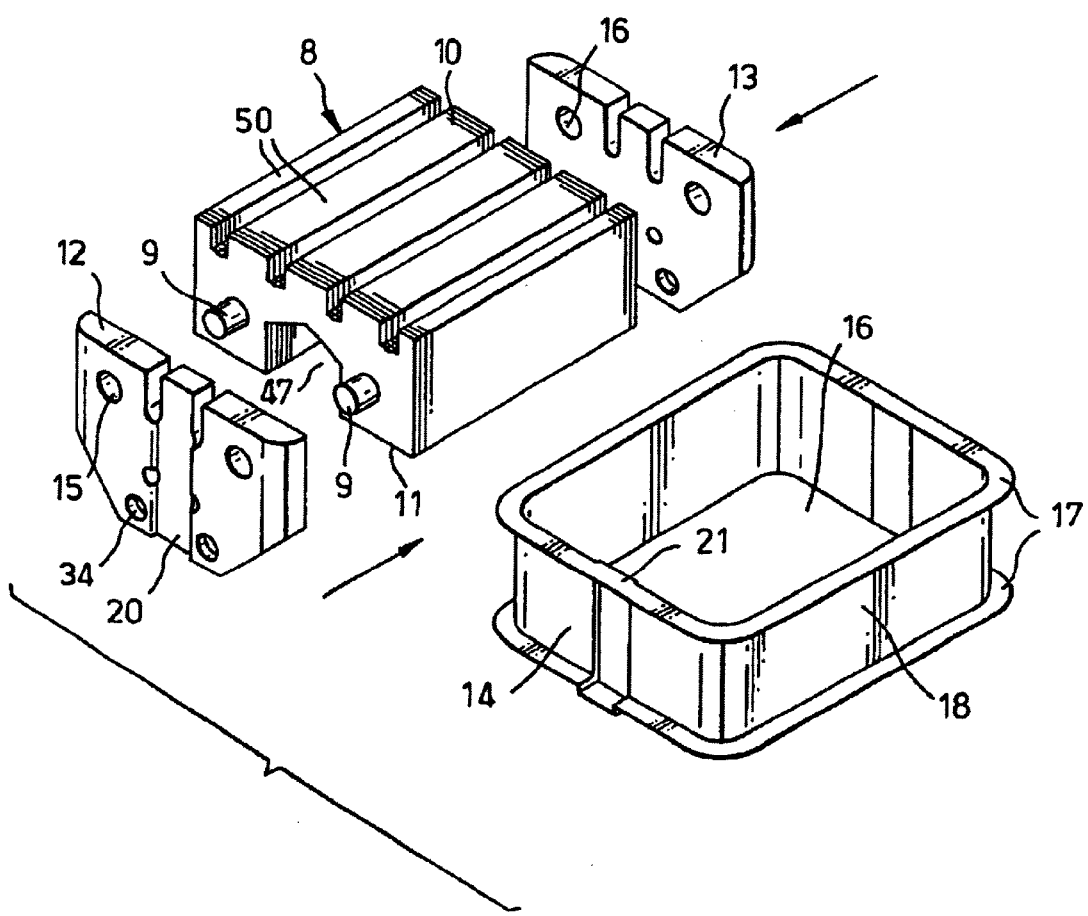
FIG. 2 is a perspective view of the components used to produce a complete magnet core, with the sheet stack in the stacked condition.
Figure 3:
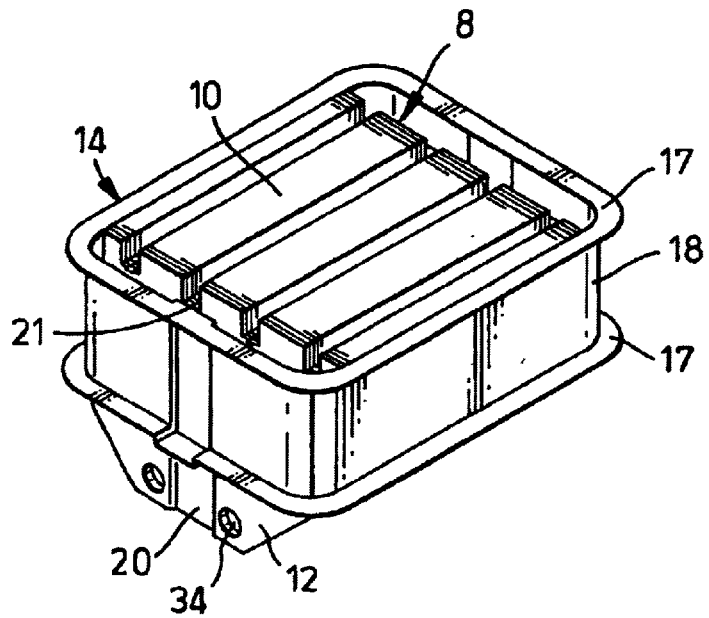
FIG. 3 is a perspective view of the magnet core according to FIG. 2 in the combined condition of all the components.

After formation of the stack, the two end faces of the sheet stack 8 are respectively connected to an additional component in the form of pole jaws 12, 13, which ensure the necessary stability of the magnetic core and serve as carriers for a further component in the form of a winding body 14 (FIGS. 2 and 3). The relative alignment of the pole jaws 12, 13 to the sheet stack 8 is appropriately carried out in that the pole jaws 12, 13 are provided with holes 15, and are thrust with these on the ends of the rods 9 projecting out of the sheet stack 8, and then accommodate these ends in themselves. Although the pole jaws can also consist of iron, they are preferably made from aluminium in order to reduce weight.

The winding body 14 substantially consists of a frame made from insulating material, e.g. plastic, which in the embodiment surrounds a substantially cuboid cavity 16, whose dimensions of height, length and width substantially correspond to the external dimensions of the sheet stack 8 inclusive of the pole jaws 12 and 13. Moreover the winding body 14 is provided on its upper and lower end with a respective outwardly projecting surrounding assembly flange 17, so that a surrounding accommodation space 18 results for a winding 19 (FIG. 4) between the two assembly flanges 17.

For correct positioning of the winding body 14 relative to the sheet stack 8, the pole jaws 12, 13 are provided on their outer end faces with guide grooves 20, which are disposed vertically to the rods 9 and to the magnet pole surface 10. Correspondingly, the winding body 14 has on two opposite sides inwardly projecting guide ribs 21, which, when the winding body 14 is set on the sheet stack 8 from above or below, enter the guide grooves 20 and then enable a displacement of the winding body 14 relative to the magnet pole surface 10 into a desired position (FIG. 3), which is appropriately established by a stop means not shown in further detail.

Figure 4:
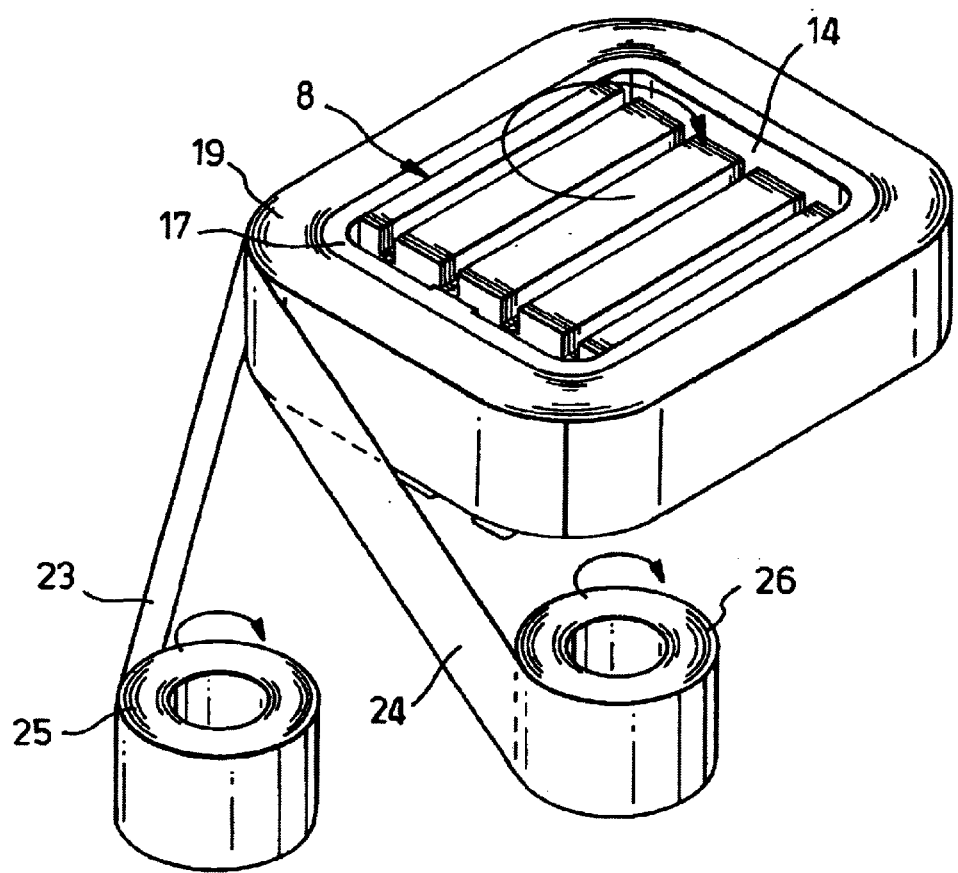
FIG. 4 is a perspective view of the winding of a winding member of the magnet core according to FIG. 3.
Figure 5:
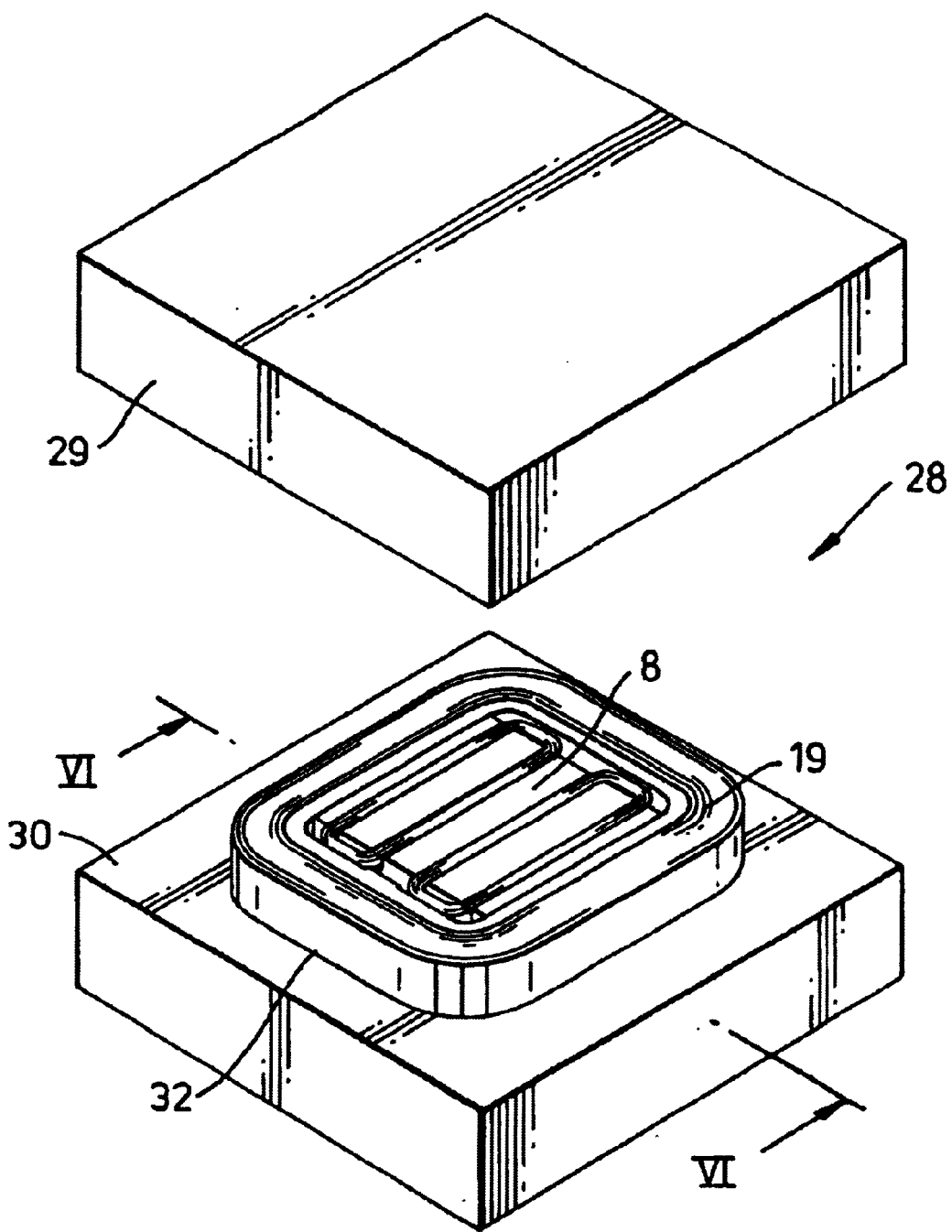
FIG. 5 is a perspective view of a magnet pole produced with the magnet core according to FIGS. 1 to 4, after arrangement in one half of a tool, serving to impregnate the sheet stack, for wetting through the sheet stack and the winding, for connecting the sheet stack with the other components and for surrounding the entire magnet pole with a hardenable mixture.

As is in particular seen from FIG. 4, the winding body 14, after its positioning on the sheet stack 8, is provided with the winding 19, which is formed from alternatively succeeding layers of a conductor 23 and of an insulator 24, and comes to lie between the assembly flanges 17. The conductor 23 consists for example of an endless aluminium strip unwound from a supply coil 25, while the insulator 24 for example is a strip of a conventional insulating film unwound from a supply coil 26. Unwinding of the conductor 23 and of the insulator 24 from the supply coils 25, 26, or their winding onto the winding body 14, is effected in a known way in the direction of the arrows entered in FIG. 4. Naturally it would also be alternatively possible to apply the winding 22 onto the winding body 14 before the latter is mounted on the sheet stack 8, or the winding, here shown as a layer winding, can be subdivided into a plurality of panels to be connected together.

In the assembly described in FIGS. 1 to 3 of a magnet core, the individual plates 1 loosely threaded onto the rods 9, are held in position only by the rods 9 and the winding body 14, the winding body 14 abutting on the lateral edges 5, 6 of the sheets 1 and on the forward or rear sides of the pole jaws 12, 13. In contrast, the winding 19 is held in position on the magnet core by the assembly flange 17. Thus the sheets 1 are simultaneously pressed against one another via the pole jaws 12, 13 with a pre-selected pressure, so that they abut closely on one another. In order to connect all these parts securely, the assembly substantially visible from FIG. 4 is inserted into a mold or a shaping tool 28 (FIGS. 5 to 7); in the embodiment what is involved is a tool 28 with two tool halves 29 and 30, which are provided similarly to an injection moulding tool on opposite sides with apertures 31, 32, which in the closed condition of the tool 28 (FIG. 7) form a cavity or hollow mold space, whose dimensions are only slightly larger than the outer dimensions of the finished wound magnet pole.

Figure 6:
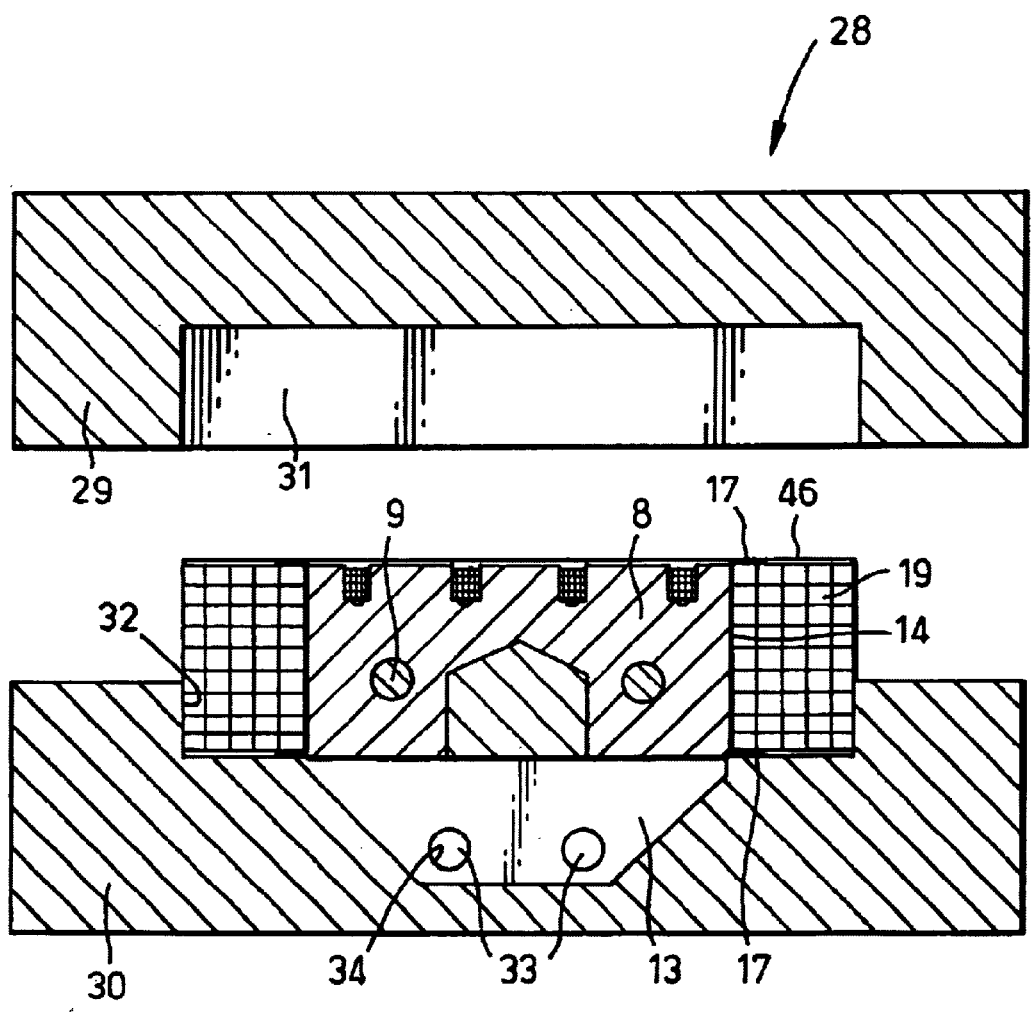
FIG. 6 is a cross-section through the tool along the line VI—VI of FIG. 5 with the magnet pole inserted.

For correct positioning of the magnet pole in the cavity, there serve on the one hand for example the lower assembly flanges 17, and on the other hand if required additional positioning means 33. In the embodiment these consist of rods, which project into holes 34 (FIG. 2), which are formed in the pole jaws 12, 13 additionally to the holes 16 and at points which remain accessible beneath the winding body 14 in the assembled condition, as in particular FIG. 6 shows. The positioning means 33 are for example mounted in the side jaws of the tool half 30 and upon closing of the tool 28 are moved automatically into the holes 34. Further positioning means not shown may be disposed in the base of the tool half 30. In this way it is possible to align the sheet stack 8 and the winding body 14 relative to one another in the tool.

Figure 7:
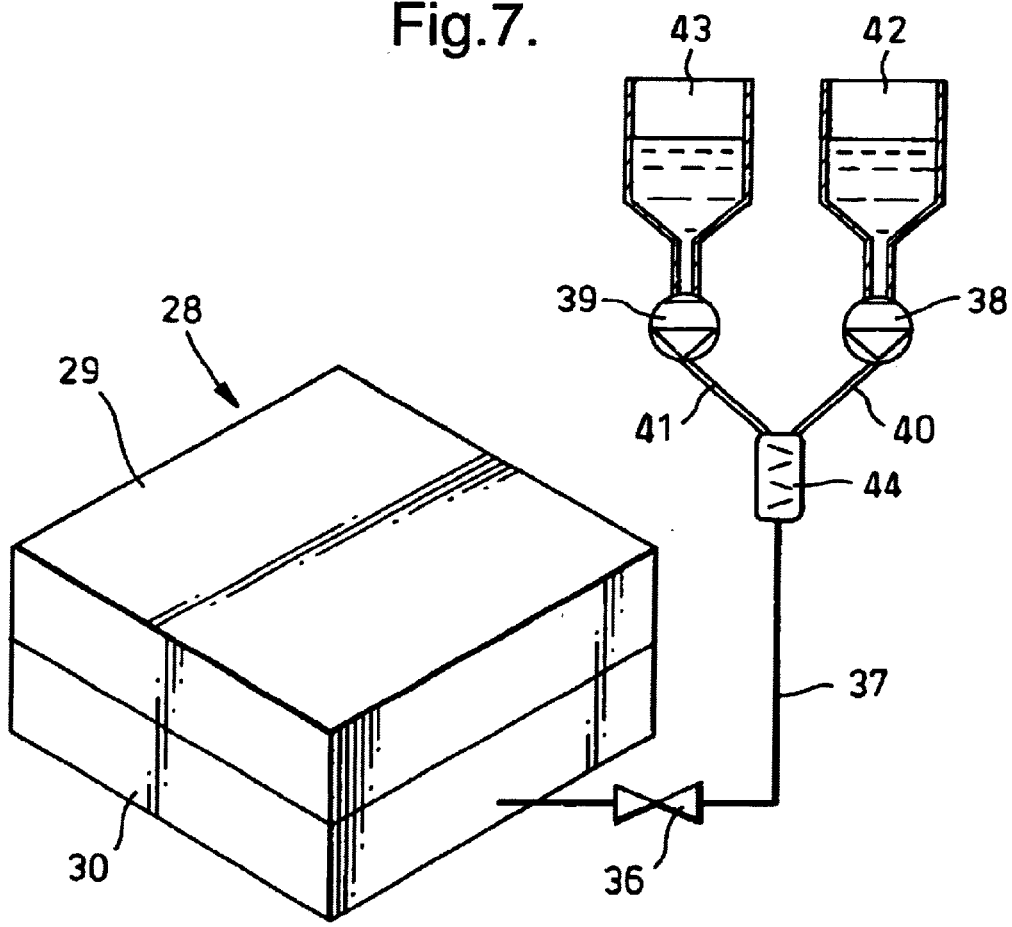
FIG. 7 is a schematic view of the insertion of a hardenable mixture into the tool according to FIGS. 5 and 6.
Figure 8:
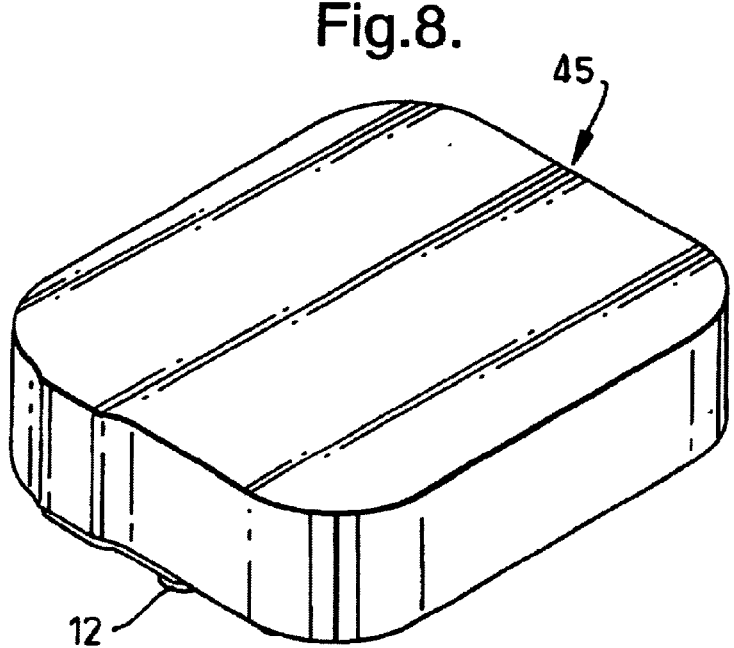
FIG. 8 is a perspective view of the completed magnet pole.

One of the tool halves 29, 30 is provided according to FIG. 7 with an inlet opening extending as far as the cavity, to which is connected the outlet of a line 37 provided with a control valve 6, and which in addition has two inlets 40 and 41 each connected to a metering pump 38 and 39. Preceding the metering pumps 38, 39 in each case is a respective mixing container 42, 43 and following them is a mixer 44 incorporated in the line 37. These devices serve the purpose of preparing a hardenable mixture, in particular a casting resin mixture, and after closing the tool 28, of introducing it into the cavity. In this way, in one single working step, a plurality of objects are achieved. On the one hand the loosely stacked sheets 1 of the sheet stack 8, by means of insertion of the mixture, are provided with the adhesive layers necessary between them, and simultaneously with the use of an adhesive, they are connected together to form a solid packet. On the other hand this packet is connected with the assembly 45 forming with the other components of the finished magnet pole (FIG. 8), to form a solid constructive unit, which simultaneously is covered as an entire unit and in particular at the cut edge of the sheets 1, with an anti-corrosion layer, which is indicated schematically in FIG. 6 by a line 46. The pre-selectable thickness of this layer substantially depends on the spacing between the various components of the assembly after insertion into the tool from one another, and from the wall portions defining the cavity, and can for example come to up to 10 mm, preferably 2 to 3 mm. Moreover, the assembly 45, due to the complete coverage with the hardenable mixture, receives its final mechanical electromagnetic and geometric properties, the special design of the tool 28 depending on the individual case, and the apertures 31, 32 forming the mold hollow, contributing to this.

The mixture to be used is preferably a hardenable (Duroplastic) casting resin mix based on epoxy or polycyloolefine and consists for example of two components, namely for example a casting resin prepared in the mixing container 42 and if necessary provided with an additive, e.g. an epoxy resin or an epoxy resin mixture, and a hardener prepared in the mixing container 43, e.g. an epoxy hardener. The two components are metered in a preselected ratio by means of the metering pumps 38, 39, introduced into the mixer 44, intimately mixed together therein and then from that point introduced via the line 37 and the control valve 36 into the cavity. Thus supply of the casting resin mixture is effected at a pressure of e.g. 1–3 bar, in order in particular to wet through or impregnate the sheet stack 8 in such a way that all the plates are covered on all sides by a thin casting resin layer.

After the cavity is filled, the casting resin mixture, preferably with heating of the entire tool 28, is left to harden, until removal from the mold can take place and the finished assembly 45 can be removed from the tool 28. Alternatively, the tool 28 may also be heated before introduction of the casting resin mass. Moreover, it is best only to harden the casting resin mass in the tool 28 and then to subject the finished assemblies 45 to a heat treatment, in order for example to terminate the hardening procedure and/or to expel slowly-evaporating components. In addition, a cleaning stage could be added.

In an embodiment of the invention felt to be best until now, the casting resin mixture is introduced after the pressure-gelating procedure into the cavities between the plates 1 and the other components of the assembly 45, or between these and the walls of the mold hollow. The pressure-gelating process is particularly advantageous, as the shrinkage occurring during hardening is compensated for in this way. In this method, which is also termed a reaction resin injection molding (e.g. Kunststoff-Lexikon, Hrg. Dr.-Ing. K. Stoeckhart and Prof. Dr.-Ing. W. Woebcken, Carl Hanser Verlag, München, BRD, 8th edition, 1992), both reaction resin masses with a long pot time and also highly-reactive resin masses can be used, which are automatically mixed and metered with the aid of the mix container 42, 43 only briefly before injection into the tool 28, in an automatic manner. Thus the two inlets 40, 41 shown in FIG. 7 can also open into a pressure container, from which the prepared reaction resin mixture is then expressed into the line 37 by means of compressed air.

Numerous mixtures, particularly those which are thermally hardenable, are suitable for producing the assembly 45.

Preferred hardenable mixtures are epoxy resin/hardener mixtures and mixtures of a tensioned cycloolefine and a catalyst for the ring-opening metathesis polymerisation.

Suitable as epoxy resins, which can be used according to the invention are all types of epoxy resins, for example those which contain groups of the formula

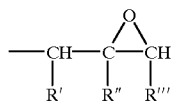

directly bonded to oxygen, nitrogen or sulphur atoms, in which either R' and R" each contain one hydrogen atom, in which case R" means a hydrogen atom or a methyl group, or R' and R" together represent —CH2CH2 of —CH2CH2CH2-, in which case R" means a hydrogen atom. As examples of such resins there should be mentioned polyglycidylesters and poly(β-methylglycidyl)esters, which can be obtained by conversion of a compound containing two or more carboxylic acid groups per molecule with epichloryhdrin, glycerine dichlorhydrin or β-methylepichloryhydrin in the presence of alkali. Such polyglycidyl esters can be derived from aliphatic polycarboxylic acids, e.g. oxalic acid, succinic acid, glutaric acid, adipic acid, pimelic acid, suberic acid, azelaic acid, sebacic acid or dimerized or trimerized linolaic acid, from a cycloaliphatic polycarboxylic acids such as tetrahydrophthalic acid, 4-methyltetrahydrophthalic acid, hexahydrophthalic acid and 4-methylhexahydrophthalic acid, and from aromatic polycarboxylic acids, such as phthalic acid, isophthalic acid and terephthalic acid.

Further examples are polyglycidyl ethers and poly(β-methylglycidyl) ethers, which are obtainable by conversion of a compound containing at least two free alcoholic and/or phenolic hydroxyl groups per molecule with the corresponding epichlorhydrin under alkaline conditions, or also in the presence of an acidic catalyst with subsequent alkali treatment.

These ethers can be produced with poly-(epichlorhydrin) from acyclic alcohols, such as ethylene glycol, diethylene glycol and higher poly-(oxyethylene)-glycols, propane-1,2-diol und poly-(oxypropylene)-glycols, propane-1,3-diol, butane-1,4-diol, poly-(oxytetramethylene)-glycols, pentane-1,5-diol, hexane-1,6-diol, hexane-2,4,6-triol, glycerine, 1,1,1-trimethylolpropane, pentaerythrite und sorbite, from cycloaliphatic alcohols, such as resorcite, chinite, bis-(4-hydroxycyclohexyl)-methane, 2,2-bis-(4-hydroxycyclohexyl)propane and 1,1-bis-(hydroxymethyl)-cyclohexene-3, and from alcohols with aromatic cores, such as N,N-bis-(2-hydroxyethyl)-aniline and p,p'-bis-(2-hydroxyethylamino)-diphenylmethane. They can also be produced from single-core phenols, such as resorcin und hydroquinone, and multicore phenols such as bis-(4-hydroxyphenyl)-methane, 4-4dihydroxydiphenyl, bis-(4hydroxyphenyl)-sulfone, 1,1,2,2-tetrakis-(4hydroxyphenyl)ethane, 2,2-bis-(4-hydroxyphenyl)propane (bisphenol A) and 2,2-bis-(3,5-dibromo-4hydroxyphenyl)-propane.

Further suitable hydroxy compounds for producing polyglycidyl ethers and poly(β-methylglycidyl) ethers, are the novolacks obtainable by condensation of aldeyhdes, such as formaldehyde, acetaldehyde, chloral and furfural and phenoline, such for example as phenol, o-cresol, m-cresol, p-cresol, 3,5-dimethylphenol, 4-chlorphenol and 4-tert.-butylphenol.

Poly-(N-glycidyl)-compounds can be obtained for example by dehydrochlorination of the conversion products of epichloryhdrin with at least two amines containing amino hydrogen atoms, such as such as aniline, n-butylamine, bis-(4-aminophenyl methane, and bis-(4-methylaminophenyl)-methane. Further suitable poly-(n-glycidyl)compounds are triglycidylisocyanurate and n,n'-diglycidyl derivates of cyclic alkylene ureas, such as ethylene-urea and 1,3-propylene-urea, and hydantoines, such for example as 5,5-dimethylhydantoine.

Poly-(S-glycidyl)-compounds are for example the Di-S-glycidyl derivatives of dithiolene, such as ethane-1,2-dithiol and Bis-(4-mercaptomethylphenyl)-ether.

Examples of epoxy resins with groups of the formula

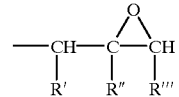

wherein R' and R" together mean a —CH2CH2- or a —CH2-CH2-CH2-CH2-group, are bis-(2,3-epoxycyclopentyl)-ether, 2,3-epoxycyclopentylglycidylether, 1,2-bis-(2,3-epoxycyclopentyloxy)-ethane and 3',4'-epoxycyclohexylrnethyl-3',4'-epoxycyclohexane-carboxylate.

Also considered are epoxy resins, in which the glycidyl groups or β-methylglycidyl groups are bonded to heteroatoms of various types, e.g. the N,N,O-triglycidyl derivate of 4-aminophenol, the glycidylether/glycidylester of salicylic acid or p-hydroxybenzoic acid, N-glycidyl-N'-(2-glycidyloxypropyl)-5,5dimethylhydantoine and 2-glycidyloxy-1,3-bis-(5,5-dimethyl-1-glycidylhydantoinyl-3)-propane.

If required, epoxy resin mixtures can be used.

Preferably, diglycidylethers of bisphenols are used. Examples include bisphenol A-diglycidyl ether, bisphenol F-diglycidyl ether and bisphenol S-diglycidyl ether. Bisphenol A-diglycidyl ether is particularly preferred.

Quite particularly preferred are liquid and low-viscosity epoxy resins. Appropriately the viscosity at 25° C. does not exceed a value of 20'000 mPas.

In a method according to the invention, all the known epoxy resin hardeners can in theory be used.

Preferably a carboxylic acid or a carboxylic acid anhydride is used as an epoxy hardener.

Suitable carboxlic acids include aliphatic dicarboxylic acids, such as oxalic acid, malic acid, succinic acid, glutaric acid, adipic acid, pimelic acid, suberic acid, azelaic acid, sebacic acid, 3, 6, 9-trioxaundecandic acid, or dimerized or trimerized linoleic acid;

cycloaliphatic polycarboxylic acids, such as tetrahydrophthalic acid, 4-methyltetrahydrophthalic acid, hexahydrophthalic acid and 4-methylhexahydrophthalic acid; aromatic dicarboxylic acids, such as phthalic acid, isophthalic acid, terephthalic acid or naphthalic acid;

or diester-dicarbooxylic acids, which are obtainable for example by conversion of glycols, e.g. polypropylene glycol with two equivalents dicarboxylic acid anhydride, such e.g. as tetrahydrophthalic acid anhydride.

Preferably liquid or easily-melting dicarboxylic acid anhydrides are used as epoxy resin hardeners.

Particularly preferred anhydride hardeners are methylnadicanhydride, tetrahydrophthalic acid anhydride and methyltetrahydrophthalic acid anhydride, methylnadicanhydride and methyltetrahydrophthalic acid anhydride being preferably used as an isomer mixture.

If required the anhydride hardener can be used in combination with a reaction accelerator conventional for anhydride hardeners. As reaction accelerators tertiary amines, carboxylic acid salts, metal chelates or organophosphenes, for example, are suitable. Preferred accelerators are the tertiary amines, such for example as N, N-dimethylbenzalamine, or substituted imidazoles.

In a further preferred embodiment of the invention, there is used as a hardenable mixture a mixture of a tensioned cycloolefine and a catalyst for the ring-opening metathesis polymerisation.

A particular advantage of the method described for manufacturing the assembly 45 resides in the fact that the process steps of impregnation of the loosely layered sheet stack 8, surrounding of the other components and of the entire assembly 45 with an anti-corrosion layer 46 (FIG. 6) and the secure connection of all parts together can be effected in one single working step, without the necessity for additional mechanical connecting means. Thus the procedures of loading and unloading the tool 28, opening and closing the tool 28 and filling of the remaining cavities within the hollow mold may be to a large extent automated.

If in addition hardenable mixtures with electrically insulating properties are used, which applies to the above-named materials, then there results the further advantage that the sheets 1 are surrounded in the single named working step with an electrically insulating layer, so that in theory also entirely untreated magnetic steel sheets having no insulating layers, can be used as initial materials.

A further outstanding advantage of the invention in this case resides in the fact that the individual sheets 1 of the sheet stack 8 can be inserted in an in fact totally untreated but however stacked and densely packed condition into the tool 28. Due to the natural surface roughness in the area of their wide sides 7, there remain between the sheets 1, even in the stacked, densely packed condition a sufficiently large number and size of cavities, which fill with this mixture upon its penetration into the tool 28, which then, in the hardened condition, provides the necessary insulation between the individual sheets 1 without the formation of disruptive bubbles of the like. This effect can be further improved and optimized in that, before or during injection of the mixture, the cavity is at least partly evacuated, in order to produce a slight reduction in pressure of e.g. 2 to 10 millibars, if necessary to be determined by tests, and thus to suction the mixture additionally into the cavity, so that simultaneously the necessity is removed of expelling the air still located in the cavity with the aid of the mixture.

Finally a further advantage is that the external shape of the assembly 45 can be selected substantially independently of the shape of the individual sheets 1 produced by stamping, and of the winding 19 laid around it. In particular, by means of corresponding formation of the mold hollow, it can be assured that the external anti-corrosion layer is sufficiently thick and environmentally resistant, whilst simultaneously by means of the stacking of the sheets 1 and the pressure used to clamp them, the required thin adhesive and if necessary insulating layers can be produced between the individual sheets 1.

The embodiment according to FIGS. 1 to 8 may be modified and/or supplemented in many ways.

Particularly, the undersides 4 (FIG. 1) of the sheets 1 of the entire sheet stack and/or the undersides of the pole jaws 12, 13 can be kept free of mixture. For this purpose for example the cavity of the tool 28 is so designed that the undersides, after location of the various components in the tool 28, abut directly on corresponding wall portions. As the undersides of the sheet stacks and/or of the pole jaws 12, 13 in a complete magnet, usually consisting of a plurality of such magnet poles, are magnetically connected together by means of ferromagnetic pole backs located beneath the windings 19, it is ensured in this way that in the boundary surfaces between the magnet poles and the magnet back no magnetically disruptive slots formed by included mixture arise.

FIGS. 9 to 14 show the manufacture of a sheet stack 51 for the stator of an electrical alternating current motor. Similarly to FIGS. 1 to 8, the sheet stack 51 includes a plurality of plates or lamellae 52, which are shown in the upper portion of FIG. 9 in the exploded condition and in the lower portion of FIG. 9 in the ready stacked condition abutting parallel and flush on one another. The sheets 52 are obtained by stamping out from a raw ferromagnetic sheet metal strip or the like which has no adhesive layer. The sheets 52 in the embodiment have identical dimensions and, as can be seen from the plan view in FIG. 10, have a circular form. On their inner circumference, the sheets 52 are provided with U-shaped cut-outs 53, which in the stacked condition are aligned towards one another and form continuous grooves. In a known way, groove sleeves 54 are pressed into these grooves, said groove sleeves according to FIG. 9 extending over the entire height of the sheet stack 51 and enabling the formation of the stack in a simple way.

Figure 9:
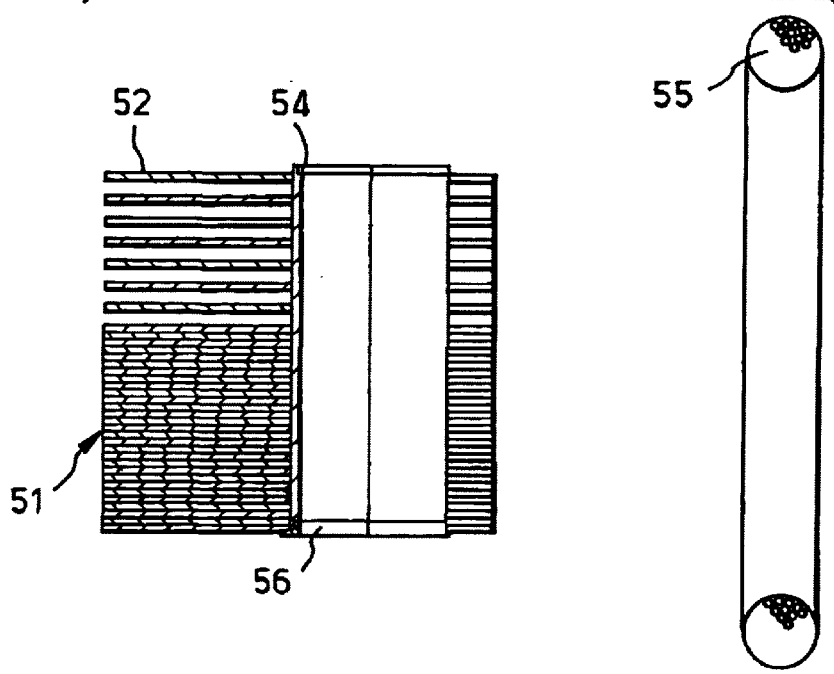
FIG. 9 is a partly exploded view of a longitudinal section through a sheet stack for the stator of an electric motor.
Figure 10:
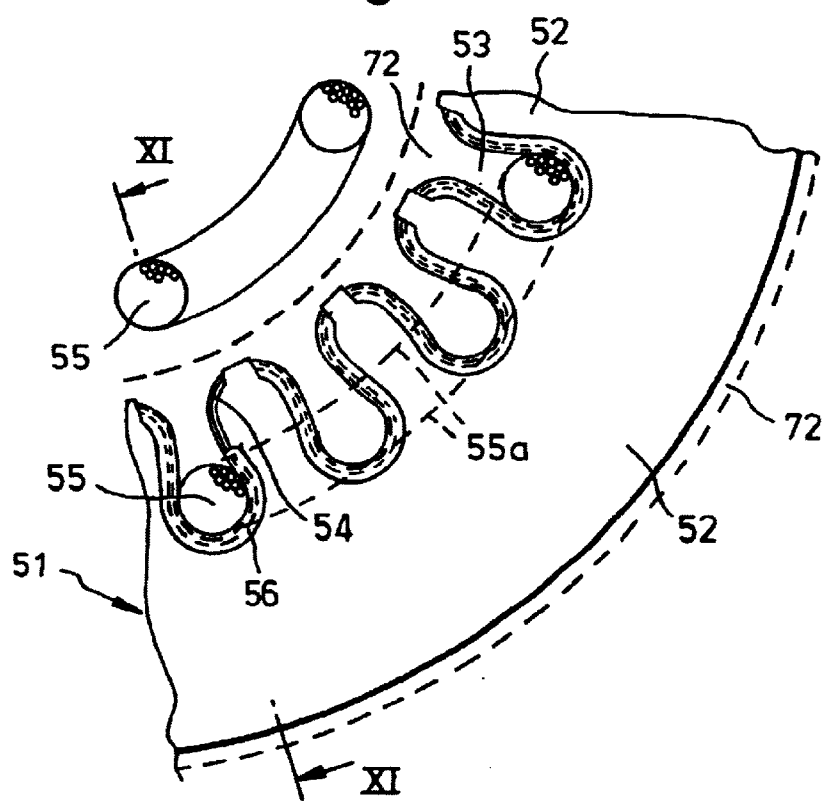
FIG. 10 is a plan view of a section of an assembly, which comprises the sheet stack according to FIG. 9 and windings shown schematically.

The groove sleeves 54 serve to accommodate windings 55 (FIG. 9) the center lines of which have a substantially flat-oval configuration, as can be seen from the front view or plan view according to FIGS. 9 and 10, for a winding 55 which is not yet mounted. These correspondingly prepared windings 55, in dependence on the type of winding provided for an individual case, are pressed with their long sides into groove sleeves 54 (FIG. 10), which are spaced apart by two or a multiple of times, in FIG. 10 by three times the groove division from one another, while their short sides form the winding heads. Therefore, in the assembled condition, the winding 55 adopts the position indicated by the broken line 55a (see also FIG. 11). The groove sleeves 54 appropriately consist of paper, cardboard or an insulating plastic, so that the windings 55 are sufficiently insulated from the plates 52, even if these latter have no insulating layer or have lost it due to the stamping procedure. In order axially to secure the groove sleeves 54 in the sheet stack 51, respective groove sleeve collars 56 (FIG. 11) can be used, which are clipped onto the upper or lower ends of the groove sleeves 54, or may also be integrated in the groove sleeves 54 as a fold.

After all the windings 55 have been inserted into the associated groove sleeves 54 and have been electrically interconnected in the necessary way (FIG. 11), the loosely pre-mounted assembly is introduced, similarly to the assembly according to FIG. 4, into a tool 59 (FIGS. 12, 13) which in the embodiment has two tool halves 60, 61, which are provided on sides facing one another with apertures 62, 63, which in the closed condition of the tool 59 form a mold hollow or cavity, the dimensions of which are slightly greater than the external dimensions of the inserted assembly. The assembly may be positioned in the tool similarly to FIG. 6 with the aid of spacers or other positioning aids not shown, which preferably engage on the assembly at points where no surrounding with a hardenable mixture is necessary.

After the tool 59 is closed in the direction of the arrows appearing in FIG. 12, a hardenable mixture is introduced into the cavity, for which purpose the tool 59, similarly to FIG. 7, is provided with an inlet opening extending as far as the cavity, and which is connected by means of a line 64 (FIG. 14) to a control valve 65 and via metering pumps 66, 67 to mixing containers 68, 69, which contain a reaction resin or a hardener or the like, in order to prepare the mixture therefrom. The reaction resin and hardener ingredients metered by the metering pumps 66, 67 are mixed in a mixer 70. The method steps of introduction of the mixture into the cavity, of hardening or hardening out of the mixture, of heat treatment and if necessary cleaning are similar to the embodiment according to FIGS. 1 to 8 and therefore need not be described again. The same applies to the usable mixtures, particularly casting resin mixtures, whose preparation, the preferred injection of the mixture at a pressure of e.g. 1 to 3 bar, the preferable additional evacuation of the cavity and the preferred use of the pressure-gelating method.

Figure 14:
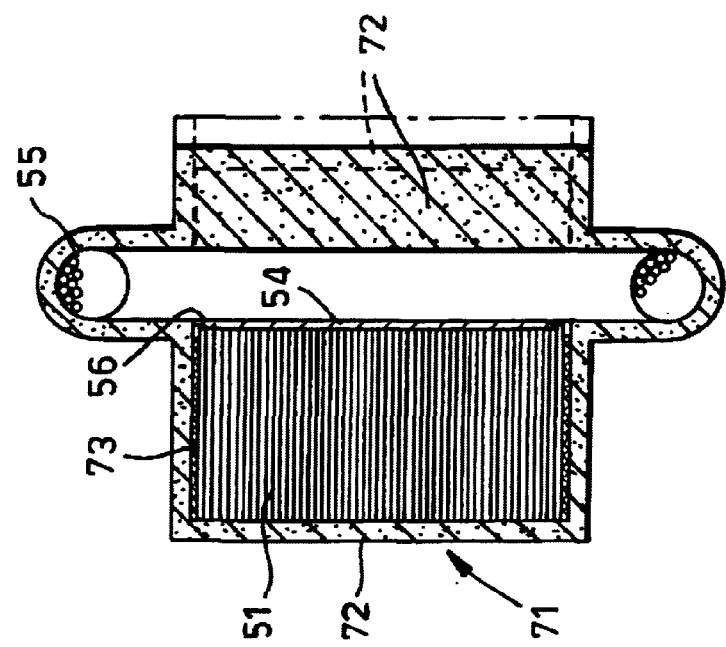
FIG. 14 is a cross-section similar to FIG. 11 through the finished stator.
Figure 13:
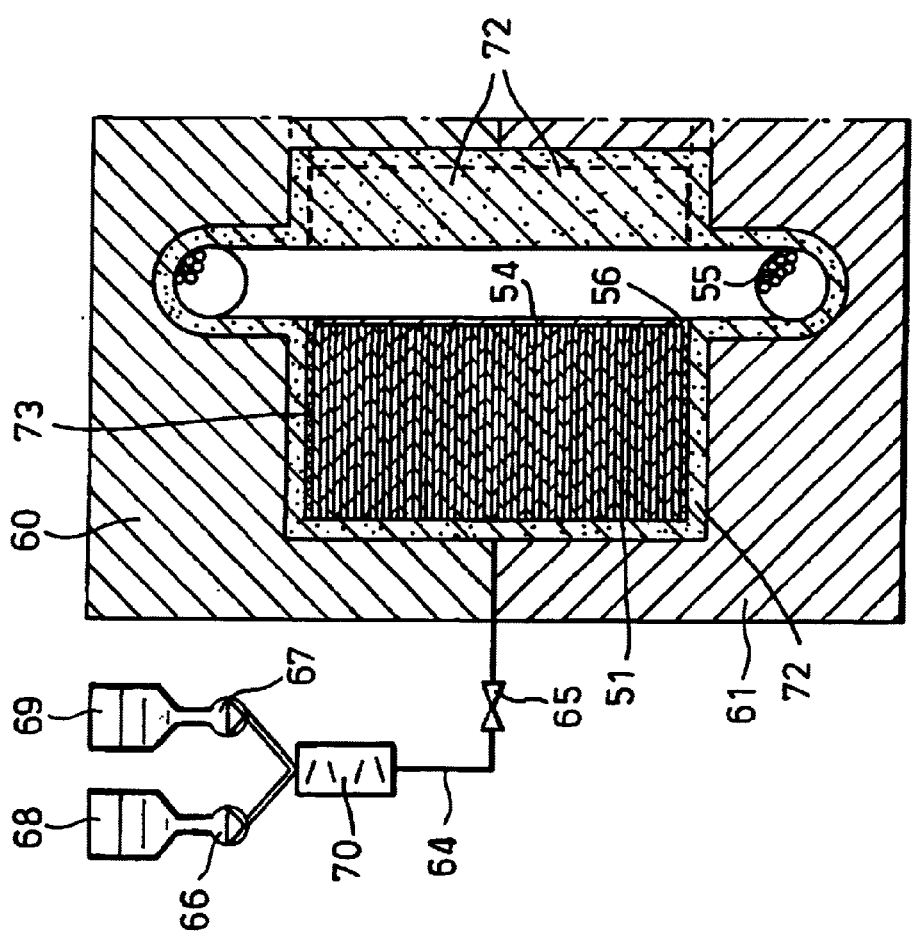
FIG. 13 is a schematic view of the introduction of a hardenable mixture into the tool according to FIG. 12.

After removal from the mold, the finished assembly 71 visible in FIG. 14 is obtained in the form of a stator. This assembly 71 is provided all round with an anti-corrosion and if necessary insulating layer 72, the thickness of which corresponds to the spacing between the various components and the walls of the associated tool halves 60, 61 in the closed condition of the tool 59, and can be correspondingly pre-selected.

The advantages attained in manufacturing the assembly 71 according to the method described are similar to those explained in conjunction with the assembly 45. Thus the external shape of the finished assembly 71 can be selected to a large extent independently on the stamped shape of the individual sheets 52, so that as required the final electrical, magnetic, mechanical and/or geometric properties of the sheet stacks or of the assembly 71 are at least partly obtained only by the treatment of all components with the hardenable mixture in a tool. This applies particularly with respect to the application of the layers between the individual sheets, the external anti-corrosion layer, the permanent interconnection of the various parts and the final external shape of the surrounded sheet stacks, assemblies or parts thereof. A particular advantage in addition is that additional connecting means such for example as screws, rivets, adhesives or the like are required neither for positioning nor for connecting the individual parts, and the mechanical strength and environmental resistance can be established by the thickness of the external covering with the hardenable mixture.

As shown in particular by FIG. 11, it may also be appropriate to cover the sheet stacks or assemblies inserted into the tool at specific points, e.g. on their outer sides, with a spacer member 73 produced from a porous material, consisting e.g. of a woven mat produced from plastic fibres or the like, which holds the sheet stack 51 or the like at a desired spacing from the walls of the mold hollow. Such elements or mats are fully impregnated with the mixture during the injection procedure, so that during hardening a stable, strong plastic resin layer results, which forms a mechanically strong external wall on the finished assembly 71 and increases its mechanical strength.

In order to improve the electrical properties (dielectric constant, loss factor) silanes, e.g. the compounds offered by the Company Osi Specialties under the tradename Silquest Silane maybe added to the hardenable mixtures. Suitable silanes are for example octyltriethoxysilane, methyltriethoxysilane and vinyltriethoxysilane.

In addition, the hardenable mixtures can contain fillers such for example as metal powder, wood powder, glass powder, glass pearls or semi-metal and metal oxides. Preferred fillers are Wollastonite, Al2O3 and SiO2, quartz powder of the various SiO2 modifications being particularly preferred.

In addition to the additives mentioned, further additives such as anti-oxidising agents, light-protective agents, plasticisers, pigments, dye stuffs, thixotropic agents, viscosity improvers, de-foamers, anti-static agents, lubricants and mold release agents can be contained in the hardenable mixtures.

Moreover, the hardenable mixtures may be produced according to known methods, conventionally with the aid of known mixing units (stirrers, kneaders, rollers, mills, dry mixers or thin-layer de-gassing mixers). The various methods for producing mixtures are known to the person skilled in the art and are for example described in Becker/Braun is "Kunstoff-Handbuch, vol. 10, Duroplaste", Carl Hanser Verlag 1988, pages 515 ff and 825 ff.

If it is desired to stack the individual sheets 1, 61 in a way other than that explained above, they can be fixed with appropriate auxiliary means, e.g. spacers, on the ends in such a way that the spacings between the individual sheets are approximately equal. In this case it is irrelevant that the spaces between all the plates are exactly identical. There need only be sufficient room for entry of the insulating resin compound into the inter-spaces between the individual plates 1, 61. The spacing between the plates 1 in this way can be adjusted for example from 1 $\mu$m to 100 $\mu$m, preferably to 2 $\mu$m to 5 $\mu$m.

The metal plates usable in the method according to the invention are preferably steel plates, although other ferromagnetic materials can also be used.

The invention is not restricted to the embodiments described by way of example, which may be varied in many ways. This applies in particular with respect to the assemblies having ferromagnetic sheet stacks and which can be manufactured according to the method described. According to the method described, sheet stacks of all types for all types of apparatus may be manufactured, which have a magnetic circuit, which for electromagnetic purposes require a sheet stack assembled from individual plates. Independently thereof, the sheet stacks may be individually manufactured according to the method described, and may be subsequently combined in a conventional method of construction with other components in order to form assemblies. Thus it is self-evident that the sheet stacks and/or assemblies described can be provided also with other components not described in more detail, e.g. with externally-leading electrical or mechanical connections, which are likewise fixed and/or formed by the surrounding hardenable mixture. Finally the invention comprises also the sheet stacks and assemblies manufactured according to the described method, the individual features being also applicable in combinations other than those described and illustrated in the drawing.

What is claimed is:

1. A method of manufacturing a finished sheet stack, consisting of ferromagnetic material, for electromagnetic assemblies, said method comprising the steps of: providing a plurality of raw magnetic steel sheets; stacking said sheets for providing a sheet stack; positioning said stack in a cavity defined by wall portions of a shaping tool; and then providing said finished sheet stack by means of a pressure-gelation method said pressure-gelation method comprising the steps of providing a liquid, thermally hardenable mixture which comprises a duroplastic epoxy resin component and a hardener component; introducing said mixture under pressure into said cavity such that said mixture is introduced into cavities between said sheets so as to connect them with one another as well as surrounds said sheets and said sheet stack as a whole on preselected sides; hardening or hardening out said mixture at least as long until removal of said sheets stack from said shaping tool can take place; and heating said shaping tool at least during hardening or hardening onto said mixture; whereby in one single working step, both said sheets are connected together and said sheets and said sheet stack are surrounded on said preselected sides with an anti-corrosion layer having a thickness which is selected by a spacing between said sheet stack and said wall portions of said shaping tool.

2. The method as defined in claim 1, wherein said raw magnetic steel sheets are not pre-treated and the hardenable mixture has a composition with electrical insulating properties so that a mutual electrical insulation is formed between said sheets.

3. The method as defined in claim 1, wherein said sheets and said sheet stack are completely surrounded with said anti-corrosion layer.

4. The method according to claim 1, wherein said cavity is at least partly evacuated before or during introduction of said mixture into said cavity.

5. A method as defined in claim 1, further using at least one section of the sheet stack for mounting a positioning member during introduction of the sheet stack into the shaping tool.

6. A method as defined in claim 1, further using a spacer member made of a porous material as a positioning member during introduction of the sheet stack into the shaping tool.

7. A method of manufacturing an electromagnetic assembly including at least one sheet stack, consisting of ferromagnetic material, and an additional component, said method comprising the steps of: providing a plurality of raw magnetic steel sheets; stacking said sheets for providing a sheet stack, forming said assembly from said stack and said component; positioning said assembly in a cavity defined by wall portions of a shaping tool and then providing said finished assembly by means of a pressure-gelation method, said pressure-gelation method comprising the steps of providing a liquid, thermally hardenable mixture which comprises a duroplastic epoxy resin component and a hardener component; introducing said mixture under pressure into said cavity such that said mixture is introduced into cavities between said sheets so as to connect them with one another as well as surrounds said sheets, said sheet stack and said assembly as a whole on preselected sides; hardening or hardening out said mixture at least as long until removal of said assembly from said shaping tool can take place; and heating said shaping tool at least during hardening or hardening onto said mixture; whereby in one single working step, said sheets are connected together, said stack is connected with said component and said assembly is surrounded on said preselected sides with an anti-corrosion layer having a thickness which is selected by a spacing between said sheet stack, said component and said wall portions of said spacing tool.

8. The method as defined in claim 7, wherein said raw magnetic steel sheets are not pre-treated and the hardenable mixture has a composition with electrical insulating properties so that a mutual electrical insulation is formed between said sheets.

9. The method according to claim 7, wherein said sheets and said sheet stack are completely surrounded with said anti-corrosion layer.

10. The method according to claim 7, wherein said cavity is at least partly evacuated before or during introduction of said mixture into said cavity.

11. A method as defined in claim 7, further using at least one section of the sheet stack for mounting a positioning member during introduction of the sheet stack into the shaping tool.

12. A method as defined in claim 7, further using a spacer member made of a porous material as a positioning member during introduction of the sheet stack into the shaping tool.

* * * * *